United States Patent
Nusier et al.

(10) Patent No.: US 9,981,692 B2
(45) Date of Patent: May 29, 2018

(54) CARBON FIBER REINFORCED POLYMER ASSEMBLY

(71) Applicant: FORD GLOBAL TECHNOLOGIES, LLC, Dearborn, MI (US)

(72) Inventors: Saied Nusier, Canton, MI (US); Mohamed Ridha Baccouche, Ann Arbor, MI (US); Matthew John Zaluzec, Canton, MI (US); David Anthony Wagner, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 14/735,643

(22) Filed: Jun. 10, 2015

(65) Prior Publication Data

US 2016/0362138 A1 Dec. 15, 2016

(51) Int. Cl.
| | |
|---|---|
| *B62D 21/15* | (2006.01) |
| *B62D 29/04* | (2006.01) |
| *B62D 21/04* | (2006.01) |
| *B62D 25/02* | (2006.01) |
| *B62D 29/00* | (2006.01) |
| *B60R 19/03* | (2006.01) |
| *B60R 19/18* | (2006.01) |

(52) U.S. Cl.
CPC .............. *B62D 21/15* (2013.01); *B60R 19/03* (2013.01); *B60R 19/18* (2013.01); *B62D 21/04* (2013.01); *B62D 21/157* (2013.01); *B62D 25/025* (2013.01); *B62D 29/005* (2013.01); *B62D 29/041* (2013.01); *B60R 2019/1853* (2013.01)

(58) Field of Classification Search
CPC ...... B62D 21/15; B62D 21/04; B62D 29/041; B62D 21/157; B62D 29/005; B62D 25/025; B60R 2019/1853; B60R 19/18; B60R 19/03
USPC ..................................................... 296/187.03
See application file for complete search history.

(56) References Cited

U.S. PATENT DOCUMENTS

| | | | | |
|---|---|---|---|---|
| 6,468,613 | B1 * | 10/2002 | Kitano | B32B 15/08 428/113 |
| 6,779,830 | B2 * | 8/2004 | Patberg | B60J 5/0416 296/146.6 |
| 7,458,450 | B2 * | 12/2008 | Karaki | B60R 19/00 188/376 |
| 7,784,550 | B2 * | 8/2010 | Nutley | E21B 17/10 166/179 |

(Continued)

FOREIGN PATENT DOCUMENTS

DE 102012018718 A1 3/2014

*Primary Examiner* — Joseph D. Pape
*Assistant Examiner* — Dana D Ivey
(74) *Attorney, Agent, or Firm* — Jason Rogers; Brooks Kushman

(57) ABSTRACT

An impact absorbing assembly comprises a CFRP part including a first portion and a second portion that are connected by a metal bending hinge connector. The metal bending hinge connector bends in response to an impact force being applied to the assembly to inhibit the CFRP part from cracking. The metal bending hinge connector may be a tubular member that defines an opening extending from a first end to a second end of the tubular member. The tubular member receives the first CFRP part in the first end and the second CFRP part in the second end. The impact absorbing assembly may be, for example, a longitudinally extending rail or a sub-frame arm.

10 Claims, 4 Drawing Sheets

(56) References Cited

U.S. PATENT DOCUMENTS

| | | |
|---|---|---|
| 8,070,904 B2 | 12/2011 | Howe et al. |
| 8,882,183 B2 | 11/2014 | Suzuki et al. |
| 2012/0242112 A1 | 9/2012 | Yamamoto |
| 2013/0154310 A1 | 6/2013 | Neumann et al. |
| 2013/0276574 A1 | 10/2013 | Uhl |
| 2014/0084633 A1 | 3/2014 | Matsuda et al. |
| 2014/0183902 A1 | 7/2014 | Seo et al. |
| 2014/0245922 A1 | 9/2014 | Hirashima et al. |
| 2014/0286700 A1 | 9/2014 | Tiryaki et al. |

* cited by examiner

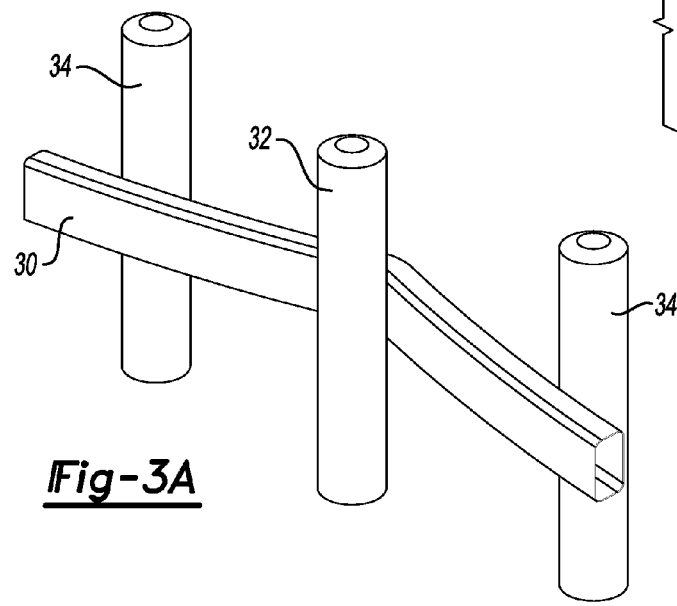
Fig-3A
Fig-3B
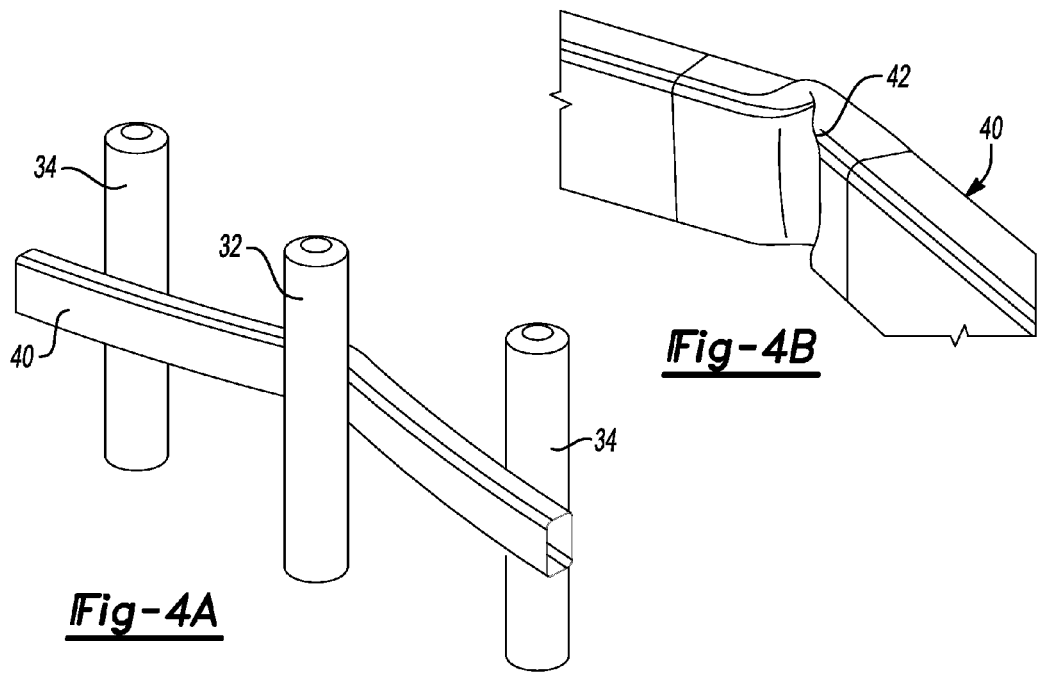
Fig-4A
Fig-4B

CARBON FIBER REINFORCED POLYMER ASSEMBLY

TECHNICAL FIELD

This disclosure relates to collision energy absorption assemblies for vehicles.

BACKGROUND

Carbon Fiber Reinforced Polymer (hereinafter "CFRP") parts are strong but brittle and may crack when bending or axial loads are applied in a collision. The structural integrity of the part may be compromised if a CFRP part cracks.

Longitudinal structural members such as frame rails and sub-frame arms are normally formed of steel and are designed to bend in response to bending or axial loads applied in collision impact loading. The strength and light weight characteristics of CFRP parts potentially offer weight savings for vehicles compared to steel parts. However, parts that are subject to collision impacts that must be absorbed to meet collision standards are not generally made from CFRP because the material is brittle and tends to crack. The ability of the part to absorb energy is essentially lost when the part cracks.

This disclosure is directed to solving the above problems and other problems as summarized below.

SUMMARY

According to one aspect of this disclosure, an impact absorbing assembly is provided for a vehicle that comprises a first CFRP part and a second CFRP part joined by a metal part. The first and second CFRP parts are spaced from each other and located to form a bending trigger location, wherein the metal part bends in response to an impact load applied to the assembly.

According to another aspect of this disclosure, an impact absorbing assembly is disclosed that comprises a CFRP part including a first portion and a second portion that are connected by a metal bending hinge. The metal hinge bends in response to an impact force being applied to the assembly to inhibit the CFRP part from cracking in response to an impact load applied to the assembly.

A further aspect of this disclosure relates to an impact absorbing assembly for a vehicle including a first CFRP part, a second CFRP part and means for absorbing an impact provided between the first CFRP part and the second CFRP part.

An alternative aspect of this disclosure that may be incorporated in one or more of the above impact absorbing assemblies may include that the metal part is a tubular member that defines an opening extending from a first end to a second end of the tubular member. The tubular member may receive the first CFRP part and the second CFRP part in the first end and the second end, respectively.

One example of the impact absorbing assembly extends longitudinally in the vehicle and may be subject to a bending load in a front end impact or an axial load in a side impact. The impact absorbing assembly may be a longitudinally extending rail or a sub-frame arm.

The metal part may be made of aluminum having greater ductility than the CFRP parts.

The above aspects of this disclosure and other aspects will be described in greater detail below with reference to the attached drawings.

BRIEF DESCRIPTION OF THE DRAWINGS

FIG. 3A is a diagrammatic representation of a three point bending test performed on a CRPF beam without a metal hinging portion.

FIG. 3B is a fragmentary drawing of the beam shown in FIG. 3A after cracking.

FIG. 4A is a diagrammatic representation of a three point bending test performed on a CFRP beam including a metal bending hinge portion.

FIG. 4B is a fragmentary drawing of the beam shown in FIG. 4A after bending.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
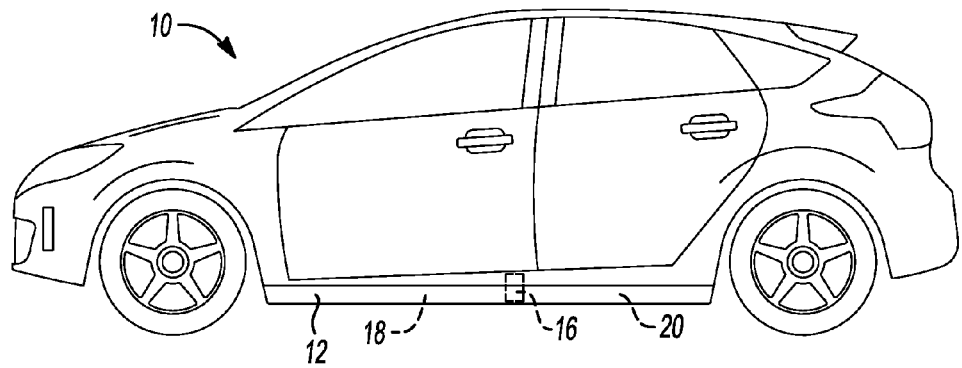
FIG. 1 is a side elevation view of a vehicle including a CFRP sub-frame arm that includes a metal hinging portion joining two CFRP portions at a trigger point location.

Referring to FIG. 1, a vehicle 10 is illustrated that includes a rocker assembly 12. The rocker assembly 12 includes a metal bending hinge connector 16 between two Carbon Fiber Reinforced Polymer ("CFRP") portions 18 and 20.

Figure 2:
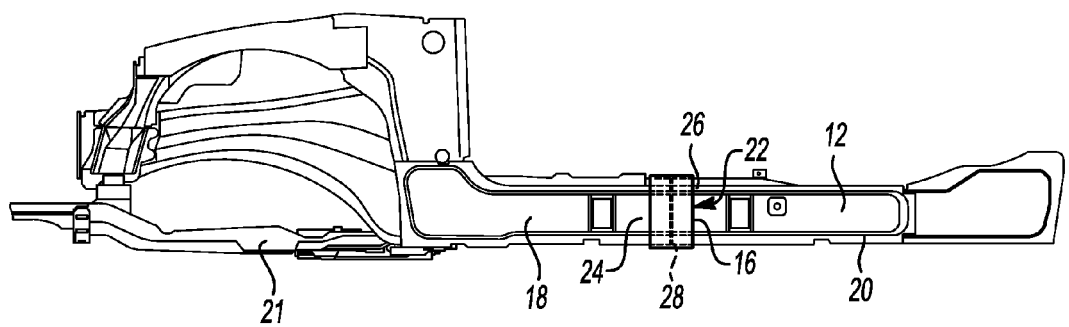
FIG. 2 is a side elevation view of the sub-frame arm.

Referring to FIG. 2, the rocker assembly 12 and a sub-frame arm 21 are illustrated in isolation as a sub-assembly. The metal connector 16 may be a tubular piece that defines an opening 22 that extends from a first end 24 that receives the first CFRP portion 18 to a second end 26 that receives the second CFRP portion 20. The metal connector 16 may be made of aluminum or steel to provide superior tensile strength and ductility compared to CFRP.

A trigger point 28 is provided on the rocker assembly 12 that corresponds to a stress riser or preferred bending location. The metal connector 16 is attached between the first CFRP portion 18 and the second CFRP portion 20 at the trigger point 28. In FIG. 2 the trigger point is provided at a location where the first CFRP portion 18 and the second CFRP portion 20 are spaced apart from each other so that the metal connector bridges the space.

Referring to FIG. 3A, a three point bending test is illustrated diagrammatically to show a CFRP test beam 30 that is deformed by moving a center post 32 between two end posts 34 and against the CFRP test beam 30 until the CFRP beam cracks. In FIG. 3B, a fragment of the CFRP test beam 30 is shown with a crack 36.

Referring to FIG. 4A, another three point bending test is illustrated diagrammatically to show a hybrid CFRP/metal test beam 40 that is deformed by moving a center post 32 between two end posts 34 and against the hybrid CFRP/metal test beam 40 until the hybrid CFRP/metal test beam 40 bends. In FIG. 4B, a fragment of the hybrid CFRP/metal test beam 40 is shown with a bend 42 formed in the metal connector 16 joining the first CFRP portion 18 and the second CFRP portion 20 for increasing energy absorption of the hybrid CFRP/metal test beam 40.

Figure 5:
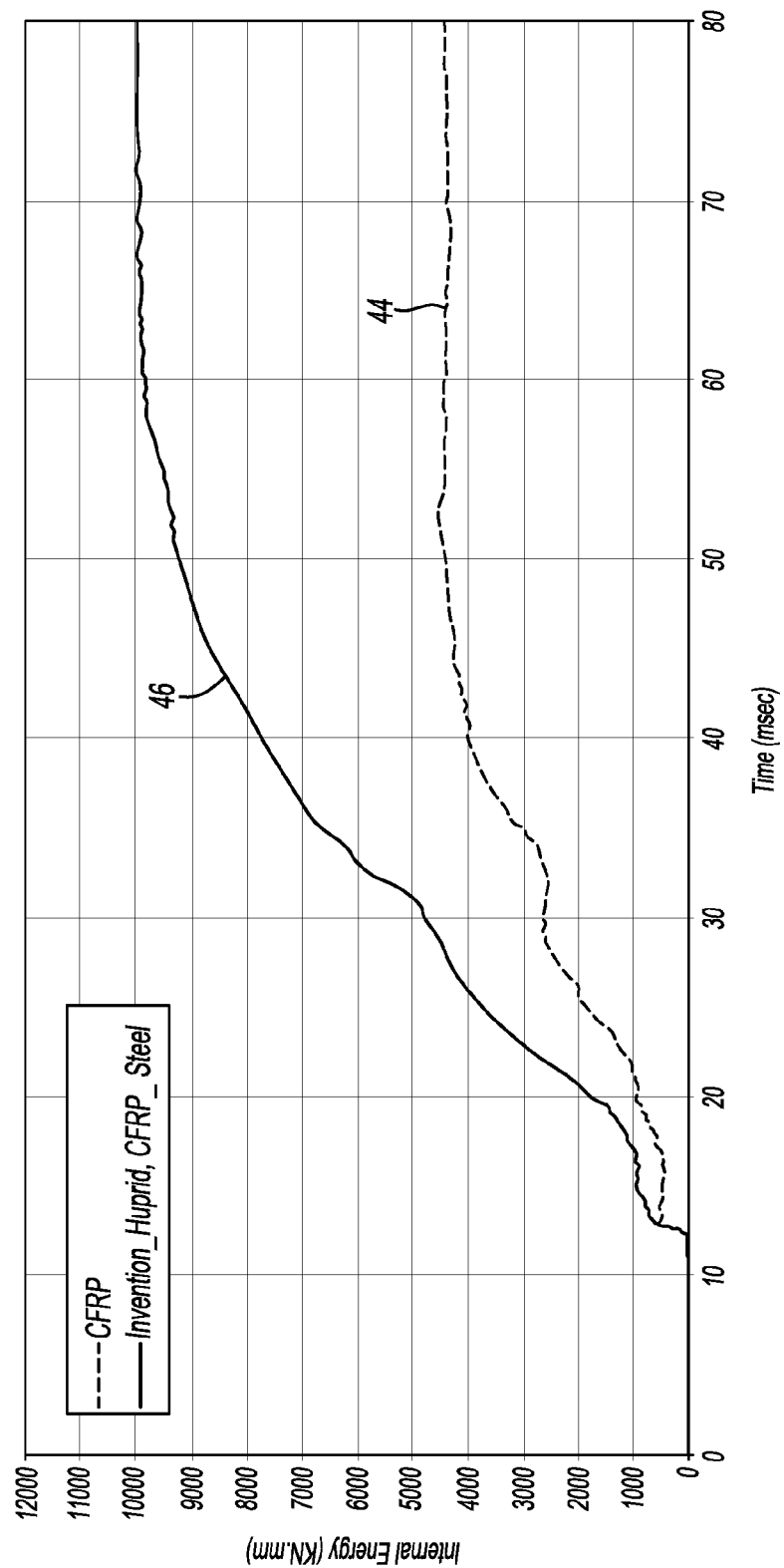
FIG. 5 is a graph of the internal energy absorbed in kN·mm comparing the results of the bending test of FIG. 3 to FIG. 4.

Referring to FIG. 5, a graph is provided to illustrate the amount of internal energy absorbed in kN·mm comparing the results of the bending test of the CFRP beam 30 as the dashed line 44 to the hybrid CFRP/metal test beam 40 as the solid line 46. In the simulated test, the hybrid CFRP/metal test beam 40 absorbed 120% more energy than the CFRP test beam 30. The maximum internal energy absorbed by the CFRP beam was about 4,500 KN·mm compared to the hybrid CFRP/metal test beam 40 that absorbed maximum internal energy of about 10,000 kN·mm.

Figure 6:
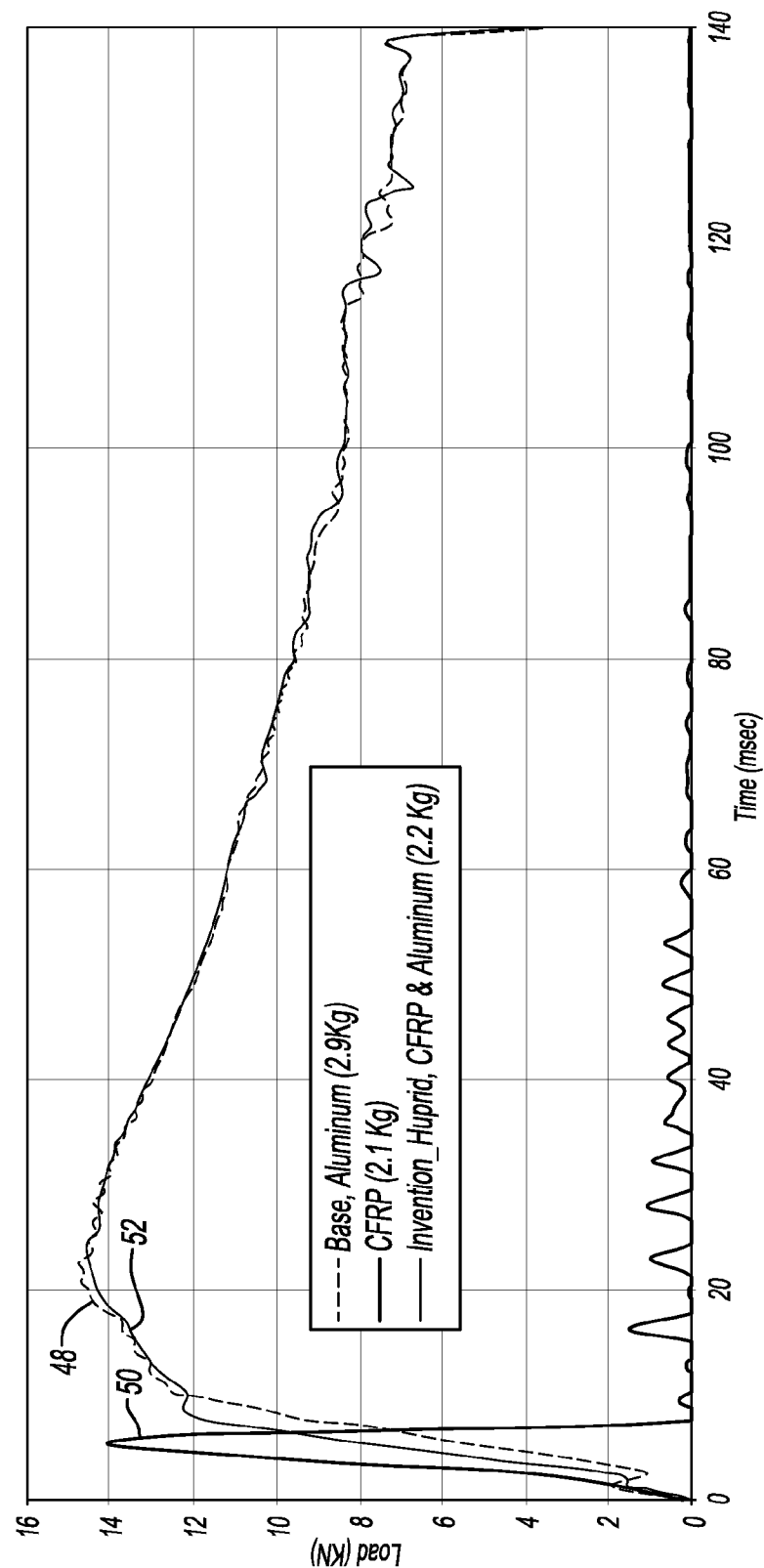
FIG. 6 is a graph of the load in kN comparing the results of the bending test of FIG. 3 to FIG. 4 and to a base all aluminum beam.

Referring to FIG. 6, a graph is provided to illustrate the load applied over time in a simulated test in kN to a base Aluminum beam having a mass of 2.9 Kg, a CFRP test beam 30 having a mass of 2.1 Kg and a hybrid CFRP/metal test beam 40 having a mass of 2.2 Kg. The base Aluminum beam test is shown by the dashed line 48, the CFRP test beam 30 is shown by the darker solid line 50 and a hybrid CFRP/metal test beam 40 is shown by the lighter solid line 52. The graph shows that the CRFP beam 30 quickly absorbed the load of up to 14 kN then cracked and failed in less than 10 msec. The base and hybrid CFRP test beam 40 both absorbed the load to a maximum of more than 14 kN and continued to absorb a decreasing amount of load until the load absorbed was reduced to about 7 kN. The nearly identical performance of the base Aluminum beam and the hybrid CFRP test beam 40 was obtained while the hybrid CFRP test beam 40 achieved a 24% weight savings.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A longitudinally extending rocker assembly for a vehicle comprising:
   a first longitudinally extending CFRP part;
   a second longitudinally extending CFRP part longitudinally aligned with the first CFRP part; and
   a metal tubular connector receiving the first and second CFRP parts in opposite ends and bridging a space between the first and second CFRP parts thereby forming a hinge where the connector bends in response to an impact load before the CFRP parts crack.

2. The assembly of claim 1 wherein the metal tubular connector is aluminum having greater ductility than the CFRP parts.

3. The assembly of claim 1 wherein the impact absorbing assembly is subject to a bending load in a front end impact.

4. The assembly of claim 1 wherein the impact absorbing assembly is subject to a lateral load in a side impact.

5. A sub-frame arm for a vehicle comprising:
   a first longitudinally extending CFRP part;
   a second longitudinally extending CFRP part longitudinally aligned with the first CFRP part; and
   a metal tubular connector receiving the first and second CFRP parts in opposite ends and bridging a space between the first and second CFRP parts thereby forming a hinge where the connector bends in response to an impact load before the CFRP parts crack.

6. An impact absorbing assembly comprising:
   a first CFRP part of a rocker assembly;
   a second CFRP part of a rocker assembly longitudinally aligned with the first part; and
   a metal tubular connector receiving the first and second parts of a rocker assembly in opposite ends thereof, wherein the connector bends in response to a lateral an impact force applied to the assembly before the CFRP parts of the rocker assembly crack.

7. The impact absorbing assembly of claim 6 wherein the metal tubular connector is aluminum that has greater ductility than the CFRP part.

8. The impact absorbing assembly of claim 6 wherein the impact absorbing assembly extends longitudinally in a vehicle and is subject to a bending load in a front end impact.

9. The impact absorbing assembly of claim 6 wherein the impact absorbing assembly extends longitudinally in a vehicle and is subject to a lateral load in a side impact.

10. A longitudinally extending sub-frame arm comprising:
    a tubular metal connector defining an opening; and
    first and second longitudinally extending carbon fiber reinforced polymer parts of the sub-frame arm received in opposite ends of the connector and defining a space between the first and second longitudinally extending parts with the connector bridging the space, wherein the connector is adapted to bend before the first and second parts crack in a lateral impact.

* * * * *